US010275579B2

(12) United States Patent
Flores et al.

(10) Patent No.: US 10,275,579 B2
(45) Date of Patent: *Apr. 30, 2019

(54) VIDEO FILE ATTRIBUTION

(71) Applicant: INTERNATIONAL BUSINESS MACHINES CORPORATION, Armonk, NY (US)

(72) Inventors: Romelia H. Flores, Keller, TX (US); Christian E. Loza, Denton, TX (US); Olivia G. Loza, Denton, TX (US); Tomyo G. Maeshiro, Denton, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,157

(22) Filed: Dec. 14, 2017

(65) Prior Publication Data

US 2018/0107809 A1    Apr. 19, 2018

Related U.S. Application Data

(63) Continuation of application No. 15/237,353, filed on Aug. 15, 2016.

(51) Int. Cl.
*G06F 21/10* (2013.01)
*G06F 21/30* (2013.01)
*G06F 17/30* (2006.01)

(52) U.S. Cl.
CPC ...... *G06F 21/105* (2013.01); *G06F 17/30784* (2013.01); *G06F 17/30846* (2013.01)

(58) Field of Classification Search
CPC .. G06F 21/105; G06F 21/10; G06F 17/30784; G06F 17/30846; H04N 21/835; H04N 21/8352; H04N 21/2541; H04N 21/4627; H04N 21/44204; G11B 20/00166; G11B 20/00173; G11B 20/00181;
(Continued)

(56) References Cited

U.S. PATENT DOCUMENTS

| 6,460,050 B1 | 10/2002 | Pace et al. |
| 8,688,999 B2 | 4/2014 | Conwell |
| 2005/0043960 A1 | 2/2005 | Blankley |

(Continued)

FOREIGN PATENT DOCUMENTS

WO    WO 2015/063537    5/2015

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

(Continued)

*Primary Examiner* — Nelson Giddins
(74) *Attorney, Agent, or Firm* — Daniel Simek; George S. Blasiak; Heslin Rothenberg Farley & Mesiti P.C.

(57) ABSTRACT

Methods, computer program products, and systems are set forth herein and can include examining a video file using content of an authorship attribution database, the authorship attribution database including one or more authorship attribution video file record; and determining authorship attribution of the video file based on the examining. The authorship attribution database can include one or more authorship attribution video file record.

20 Claims, 12 Drawing Sheets

(58) Field of Classification Search
CPC ............. G06Q 50/184; G06Q 2220/18; G06Q 2220/16; G06Q 20/1235
See application file for complete search history.

(56) References Cited

U.S. PATENT DOCUMENTS

| | | | |
|---|---|---|---|
| 2009/0083781 A1* | 3/2009 | Yang | G06F 17/30781 725/20 |
| 2009/0265737 A1* | 10/2009 | Issa | G06F 17/30817 725/38 |
| 2010/0189368 A1 | 7/2010 | Des Jardins et al. | |
| 2011/0218920 A1 | 9/2011 | Agrawal et al. | |
| 2013/0347056 A1* | 12/2013 | Kuhlman | H04L 29/06 726/1 |
| 2014/0019594 A1* | 1/2014 | Fujita | H04N 21/8456 709/219 |
| 2017/0223423 A1* | 8/2017 | Hardy | H04N 21/2343 |
| 2018/0011992 A1* | 1/2018 | Waid | G11B 20/00086 |

OTHER PUBLICATIONS

Solanki et al., "Robust Image-Adaptive Data Hiding Using Erasure and Error Correction", IEEE Transactions on Image Processing, vol. 13, No. 12, Dec. 2004, 13 pages.

List of IBM Patent and/or Patent Applications treated as related for U.S. Appl. No. 15/842,157, filed Dec. 14, 2017, dated Dec. 14, 2017.

Flores, et al. "Video File Attribution" U.S. Appl. No. 15/237,353, filed Aug. 15, 2016.

* cited by examiner

VIDEO FILE ATTRIBUTION

CROSS-REFERENCE TO RELATED APPLICATION

This application is a continuation of U.S. patent application Ser. No. 15/237,353, filed Aug. 15, 2017, entitled, "Video File Attribution," the entirety of which is hereby incorporated herein by reference.

TECHNICAL FIELD

The present disclosure in field of computer networks and particular to content attribution of file content in a computer network.

BACKGROUND

Content creators and networks deal with problems involving content identification. The main issue being that of "freebooting", where online content is taken from one site and re-hosted on another site, or re-hosted on the same site by a different author. This re-hosting of content can result in misallocation of digital rights if for example the same video becomes significantly more popular when it is posted again. In some instances, a small revision is made by a second individual and the second individual can be allocated the digital rights of the original content creator.

SUMMARY

The shortcomings of the prior art are overcome, and additional advantages are provided, through the provision, in one aspect, of a method. The method can include in one embodiment examining, by one or more processor, a video file using content of an authorship attribution database, the authorship attribution database including one or more authorship attribution video file record; and determining, by the one or more processor, authorship attribution of the video file based on the examining.

In another aspect, a computer program product can be provided. The computer program product can include a computer readable storage medium readable by one or more processing unit and storing instructions for execution by one or more processor for performing a method. The method can include in one embodiment examining a video file using content of an authorship attribution database, the authorship attribution database including one or more authorship attribution video file record; and determining authorship attribution of the video file based on the examining.

In a further aspect, a system can be provided. The system can include, for example a memory. In addition, the system can include one or more processor in communication with the memory. Further, the system can include program instructions executable by the one or more processor via the memory to perform a method. The method can include in one embodiment examining a video file using content of an authorship attribution database, the authorship attribution database including one or more authorship attribution video file record; and determining authorship attribution of the video file based on the examining.

In another aspect a method can be provided. The method can include in one embodiment examining, by one or more processor, extracting a key segment from a received video file to define an extracted key segment; and publishing by the one or more processor an extracted key segment video file corresponding to the received video file.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
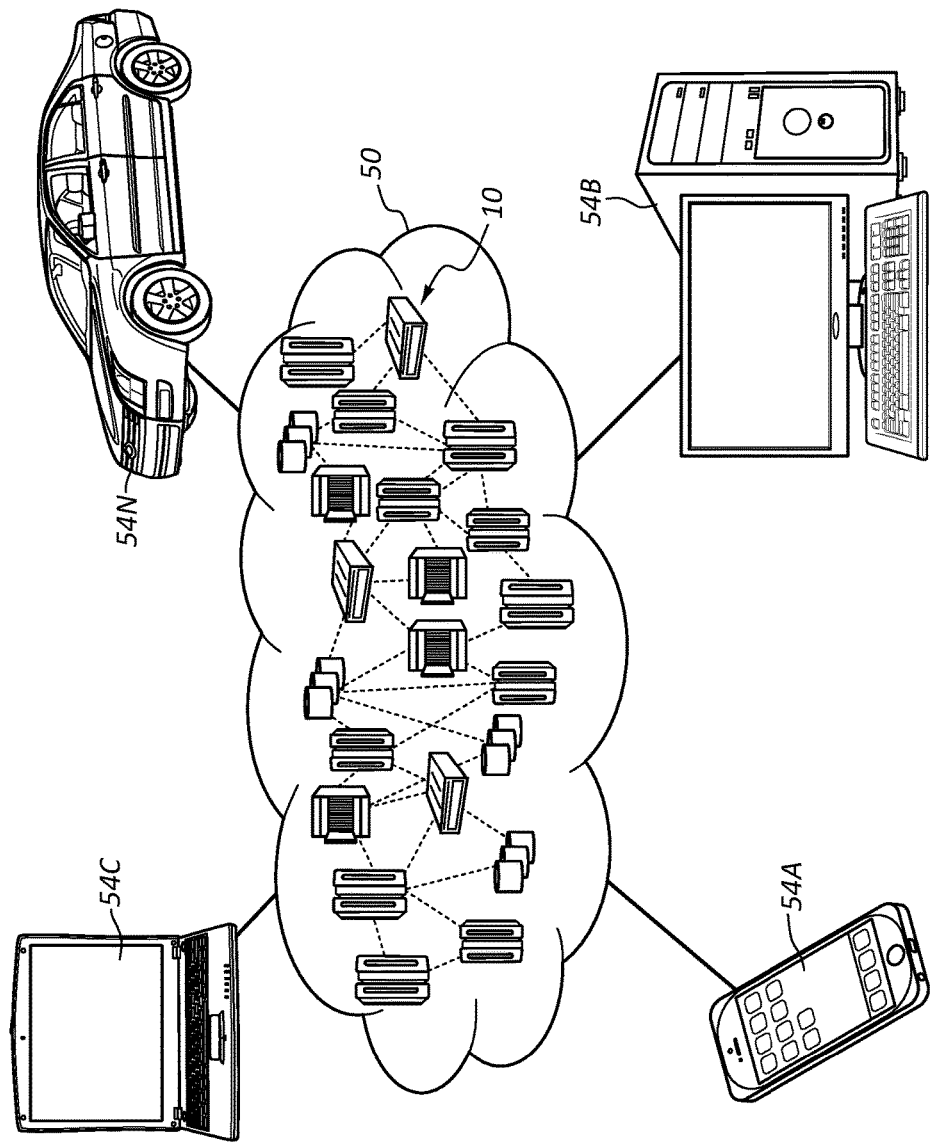
FIG. 1 depicts a cloud computing environment according to an embodiment as set forth herein.

Aspects of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Advantageously, the techniques disclosed herein allow for improved attribution of authorship to digital content such as video files.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
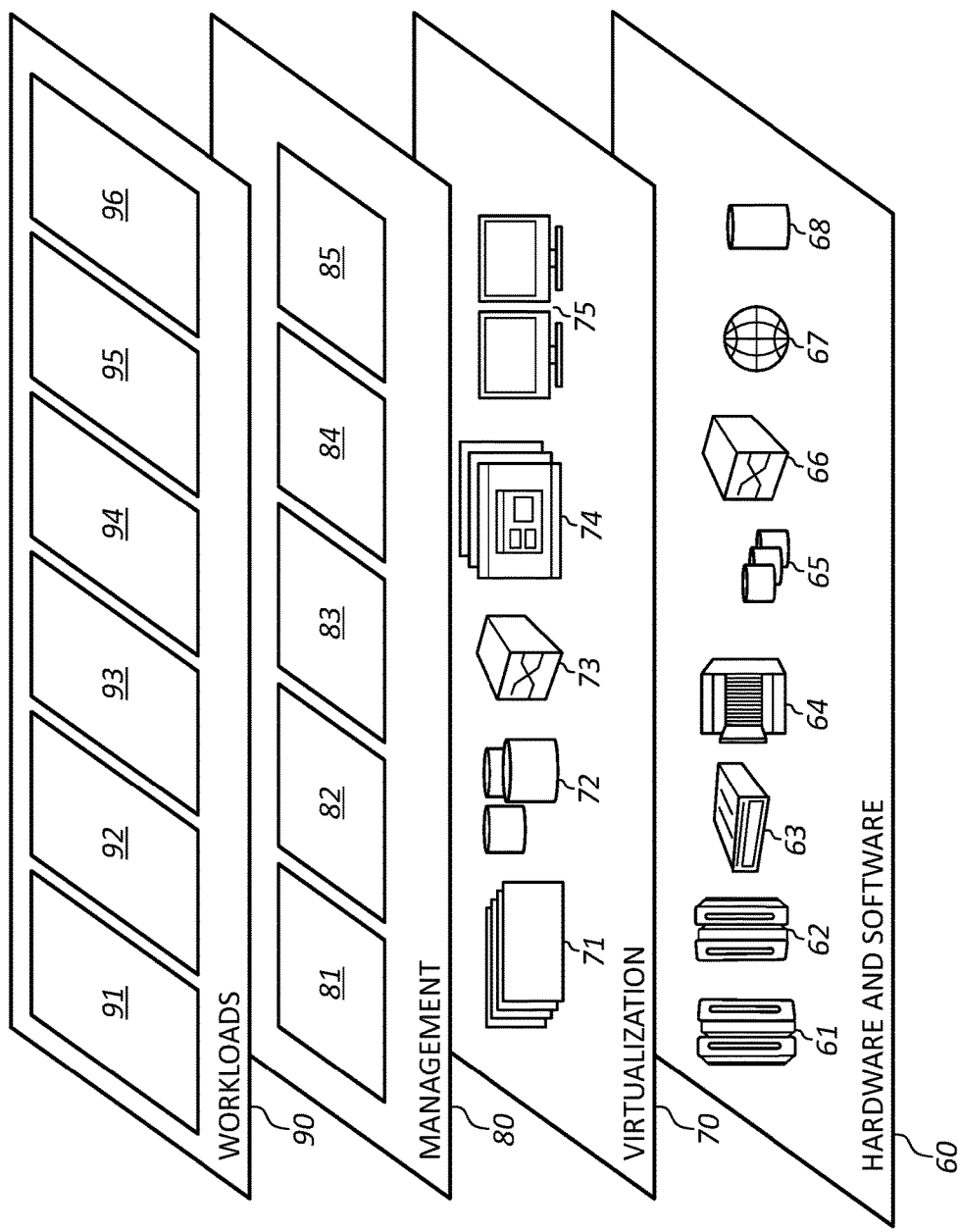
FIG. 2 depicts abstraction model layers according to an embodiment as set forth herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authorship attribution 96.

Figure 3:
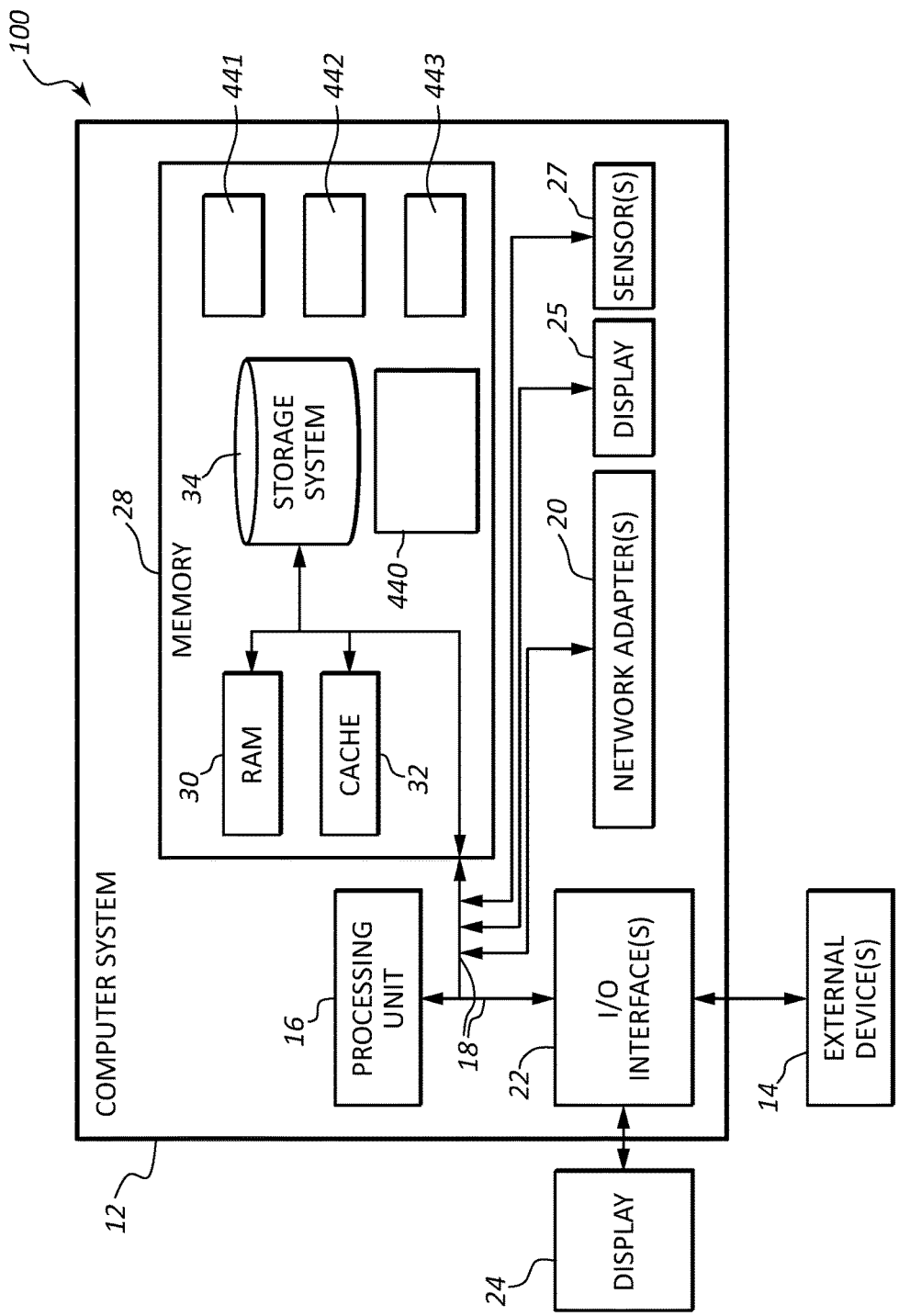
FIG. 3 depicts a hardware overview of a computing node, in accordance with an embodiment as set forth herein.

Referring now to FIG. 3, FIG. 3 depicts a hardware overview of a computing node 100, in accordance with an embodiment set forth herein. Computing node 100 is only one example of a suitable computing node and is not intended to suggest any limitation as to the scope of use or functionality of embodiments of the invention described herein. Regardless, computing node 100 is capable of being implemented and/or performing any of the functionality set forth hereinabove.

In one embodiment, computing node 100 can be provided as a cloud computing node 10 of a cloud computing environment 50 as set forth in reference to FIG. 1. In one embodiment, computing node 100 can be provided as a computing node of a computing environment other than a cloud computing environment.

In computing node 100 there can be provided a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices. Computer system 12 may be practiced in a non-distributed and/or non-cloud environment.

As shown in FIG. 3, computer system 12 in computing node 100 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one or more program (e.g., one or more program 440 and/or one or more program 441, 442, 443 as set forth herein) configured to carry out the functions of embodiments of the invention.

One or more program 440 having a set (at least one) of program modules, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In place of or in addition to one or more program 440 memory 28 can store one or more additional one or more program, e.g., one or more program 441, 442, 443.

Computer system 12 may also communicate with one or more external devices 14 such as a keyboard, a pointing device, a display 24, etc. that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via one or more network adapter 20. One or more network adapter 20 can include at least one wireless communication network adapter. As depicted, network adapter 20 communicates with the other components of computer system 12 via bus 18. It should be understood that although not shown, other hardware and/or software components could be used in conjunction with computer system 12. Examples include, but are not limited to: microcode, device vehicle operators, redundant processing units, external disk drive arrays, RAID systems, tape drives, and data archival storage systems, etc. In addition to or in place of having external devices 14 and display 24, which can be configured to provide user interface functionality, computing node 100 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a camera, e.g. a pixel array camera. A pixel array camera can be e.g. a color CMOS pixel array camera. One or more sensor device 27 can include a Global Positioning Sensor (GPS) device in one embodiment and can be configured to provide a location of computing node 100.

A representative one or more program of one or more program 440, 441, 442, 443 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one program of one or more program 441, 442, 443) can generally carry out the functions and/or methodologies of embodiments of the invention as described herein. One or more program 440 (and optionally at least one program of one or more program 441, 442, 443) can include computer readable program instructions as are set forth herein that can be stored in a computer readable storage medium within a respective computing/processing device. In one embodiment a computer readable storage medium as set forth herein can be included in memory 28 as set forth in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures for example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
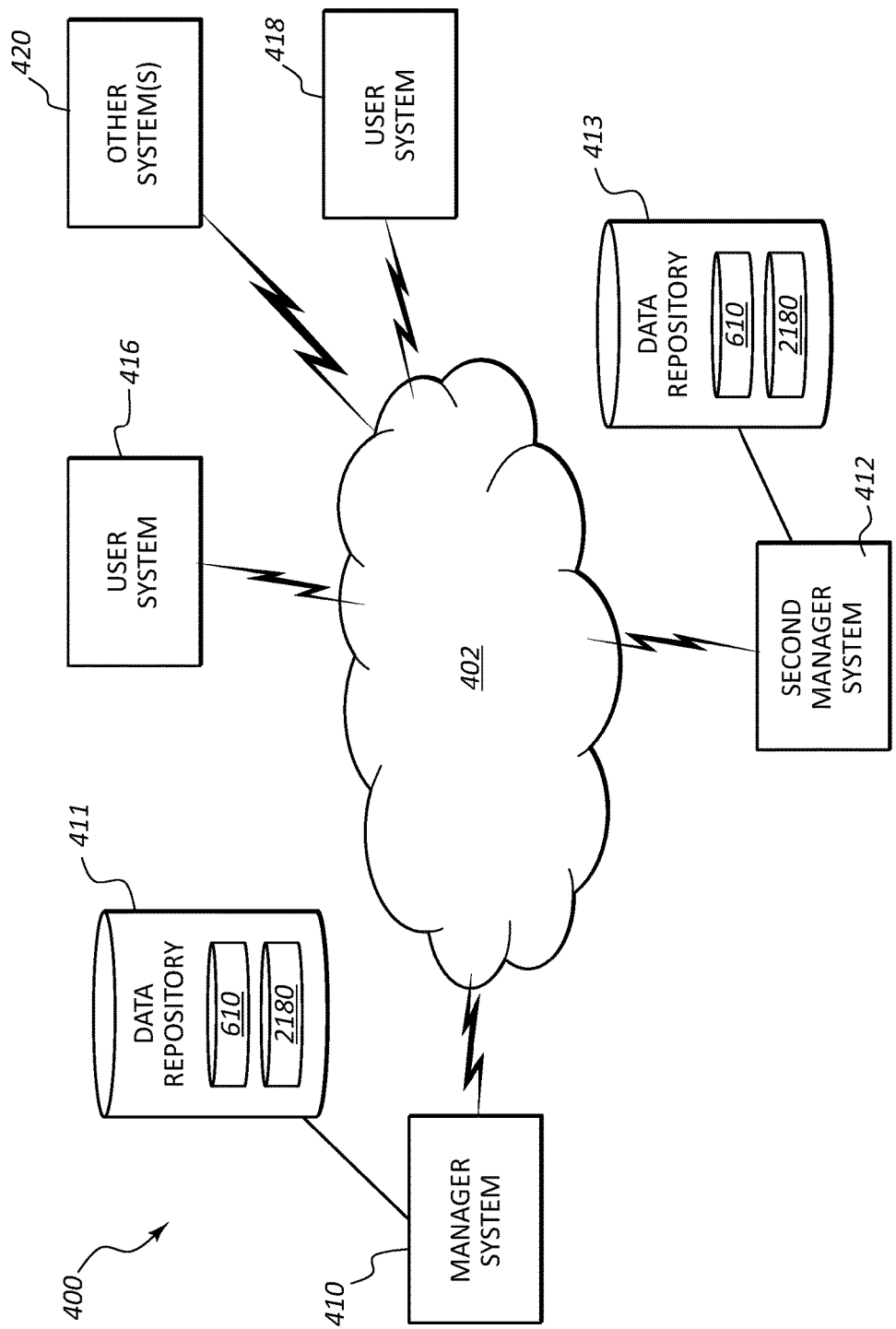
FIG. 4 is a block diagram of a system in accordance with an embodiment as set forth herein.

FIG. 4 is a block diagram of a system 400, in accordance with an embodiment as set forth herein. In the embodiment of FIG. 4, system 400 can includes numerous devices, which may be or include computing nodes 100 as previously described, connected by a network 402. For example, network 402 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 4 depicts an example environment. In one embodiment, system 400 can include a first user system 416, a second user system 418, video sharing system 410, a data repository 411 running on video sharing system 410, second video sharing system 412, a second data repository 413 running on second video sharing system 412 and other system(s) 420. Each of the systems 416, 418, 410, 412, 420 can include one or more computing node 100. Each of the systems 416, 418, 410, 412, 420 can be remote from one another in one embodiment. Each computing node 100 can run one or more program. One or more program 440 can run on one or more computing node 100 of video sharing system 410.

Each user system 416 and 418 can include e.g. a personal computer, a laptop computer, smartphone, a camera, a video camera, a tablet. Respective one or more programs of user system 416 and user system 418 can provide user interface functionality. For example, a browser of a user system 416, 418 can display a user interactive web page served by a video sharing system 410, 412.

Each video sharing system 410 and 412 can be accessed publicly by a user system (e.g. 416, 418) without authorization or by creating an account on the respective video sharing systems 410 and 412. Each video sharing system 410 and 412 can have, for example, a domain name that is accessible to the user system through the world-wide web. Each video sharing system 410 and 412 can have an IP address located in a particular country, or globally, depending on the policies of the video sharing system. A user system e.g. 416 or 418 can, for example, search a video sharing system 410 or 412 based on one or more user input, go to a particular location on the video sharing system 410 or 412, or make a request to the video sharing system 410 or 412. Upon accessing the video sharing system 410 or 412, a user system 416 and 418 can then make requests to the video sharing system 410 or 412 for a video file or a section of the video file.

A video sharing system 410, 412 can stream packet video data of the video file published on a publication database 2180 of the video sharing system. When a user system 416, 418 requests to watch the video file, the video sharing system 410, 412 can break up the video file into smaller pieces, known as for example packets, and send these packets to a target address. The user system 416, 418 can then access the packets in a variety of ways. The user system 416, 418 can process packets as they arrive, they can, for example, wait for a particular size of packets to arrive before they process, or wait for a certain packet to arrive. The packets when accessed by the user system 416, 418 can then display sections of the video file on a display of the user system 416, 418. The video file can be viewed on, for example, a website of the video sharing system 410, 412 using a browser of the user system 416, 418 or downloaded on the user system 416, 418.

In one embodiment each video sharing system 410 and 412 can be provided by a large scale video sharing system and can have characteristics common to publicly available large video sharing systems such as USTREAM, YOUTUBE, and FACEBOOK.

Video sharing systems 410 and 412 can provide users the possibility to access videos uploaded by other users. Video sharing systems 410 and 412 can be large scale video distribution video sharing systems that can input and distribute videos in different qualities (SD, 720p, 1080p, 4 k) and formats (mp4, flv, avi, mov, mkv). Video sharing systems 410 and 412 can be operative to support copyright protections and law regulations in multiple countries. Video sharing systems 410 and 412 can be operative to perform transcoding in realtime or near real time, specific to video formats. Video sharing systems 410 and 412 can be operative to support from tens of thousands to billions of video views per day, using distributed architectures and high scalability. Embodiment herein recognize that due to large scale support requirements of video sharing systems 410 and 412 video sharing systems 410 and 412 can benefit from attribution methods, products and system that use reduced resources in terms of hardware, bandwidth and power consumption.

In one embodiment, video sharing system 410, 412 can be online highly scalable video sharing systems that support authorship information exchange between video sharing system 410 and video sharing system 412. In one embodiment video sharing system 410 and video sharing system 412 can be external to one another e.g. can be one or more of logically separated, physically separated, or operated by different organizational entities.

Figure 5:
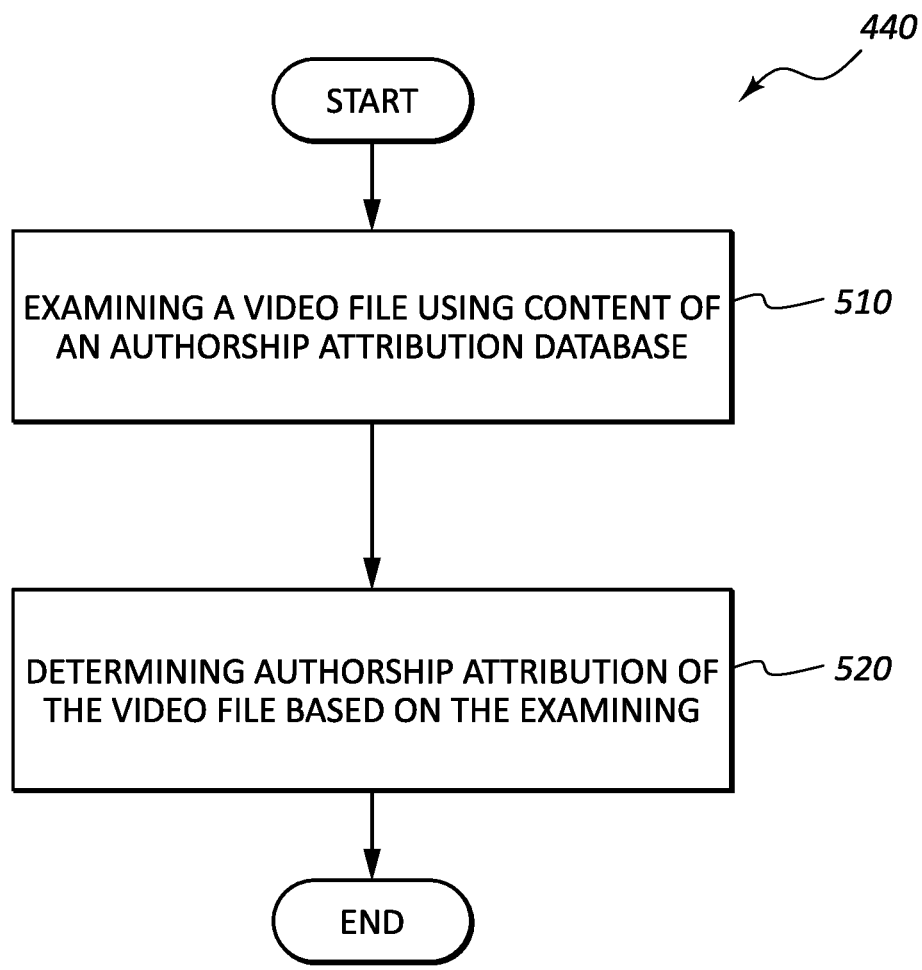
FIG. 5 is a flow diagram illustrating a method in accordance with an embodiment as set forth herein.

FIG. 5 is a flow diagram illustrating a method, in accordance with one or more aspects set forth herein. By way of example, the method described with respect to FIG. 5 can be performed using one or more program 440 running on one or more device e.g., of video sharing system 410 (FIG. 4) having one or more computing node 100 as described with respect to FIG. 3. By way of example, the method described with respect to FIG. 5 can be performed using one or more program 443 running on one or more device e.g., of video sharing system 412 (FIG. 4) having one or more computing node 100 as described with respect to FIG. 3. In one embodiment, one or more program 440 can provide the functionality of authorship attribution 96.

Figure 7:
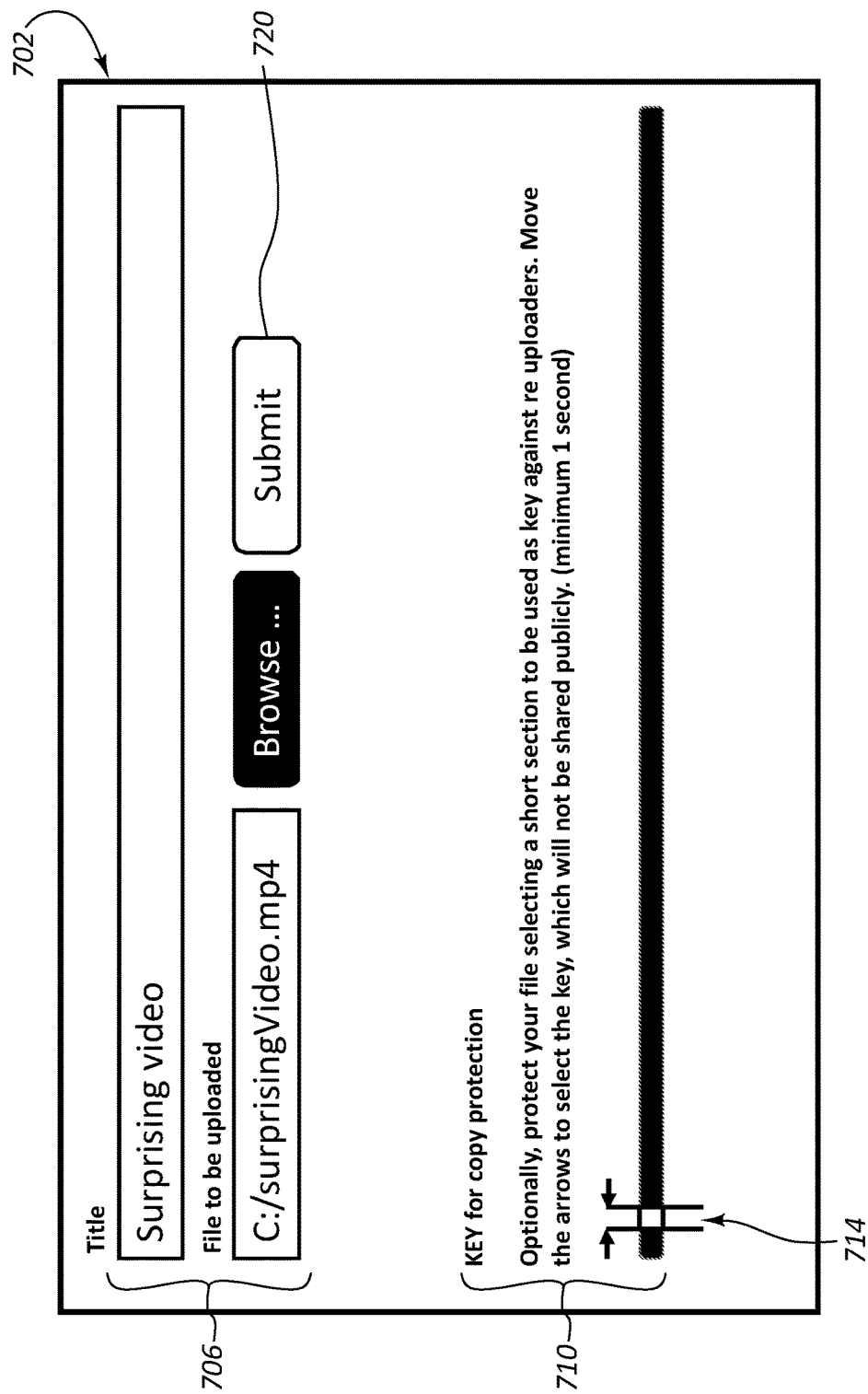
FIG. 7 is a schematic diagram illustrating a user interface for use in initiating publication of a video file and registration of video file as an authorship attribution video file in accordance with an embodiment as set forth herein.

In the embodiment of FIG. 5, one or more program 440 at block 510 can perform examining a video file. At block 520 one or more program 440 can perform determining an authorship attribution of the video file based on the examining. In one embodiment the examining can be based on information obtained from a data repository e.g. repository 411, which can include e.g. an authorship attribution database 610 and a publication database 2180 (as shown in FIG. 7).

In one embodiment, the examining at block 510 can include examining to determine whether an identified authorship attribution video file record stored in the authorship attribution database includes a superset of video data of the video file.

In one embodiment the examining at block 510 can include examining to determine whether the video file for attribution includes video data of an extracted key segment of an identified authorship attribution video file record stored in the authorship attribution database.

In one embodiment the examining at block 510 can include examining a video file for attribution using an extracted key segment associated to the video file received from the user initiating publication of the video file.

In one embodiment, the examining at block 510 can use an extracted key segment of a video file.

In one embodiment, an examining at block 510 can include determining whether a video file presented for authorship attribution includes complete information of an authorship attribution video file, information of which can be stored in an authorship attribution database 610.

In one embodiment, an examining at block 510 can include searching an authorship attribution database 610 to identify one or more authorship identification video file record identified by user requestor defined information of an attribution request.

In one embodiment, examining at block 510 can include searching an authorship attribution database 610, the authorship attribution database 610 storing information of one or more authorship attribution video file.

In one embodiment, the method can include receiving a video file, extracting a key segment from the video file to define an extracted key segment and publishing a key extracted video file absent the extracted key segment on a publication video sharing system.

In one embodiment, the examining at block 510 can include comparing a video file identified for authorship attribution to an authorship attribution video file record stored in an authorship attribution database.

In one embodiment, a method can include sharing data between video sharing systems and an examining at block 510 can include using content shared from a video sharing system external to a video sharing system performing the examining.

In one embodiment system 400 can be adapted so that authorship information can be exchanged between video sharing system 410 and video sharing system 412 to create a fair revenue share model. Authorship information can include authorship attribution video file records that can be stored in authorship attribution databases 610 of video sharing system 410 and video sharing system 412. These video sharing systems 410 and 412 can exchange information about the video files subject to registration and the key segments thereof, in order to determine automatically and efficiently the original author of a video file. An exchange of information between video sharing systems can be initiated by the author of the video file in the original video sharing system 410 or 412 where the author initiated publication of the video file, and resolved in the background between the video sharing systems 410 and 412 using a message exchange between video sharing systems 410 and 412 to exchange e.g. authorship attribution video file records using any open format.

Requirements for supporting an open format exchange between video sharing system 410 and video sharing system 412 can include (a) an extracted key segment and position of the extracted key segment and (b) the location or ID of video files identified for authorship attribution. Other details can be added to this open exchange format including but not limited to, full video files, revenue models and ads to be placed. Embodiments including extracted key segments described in this disclosure represents a simple and efficient way for one or more video sharing system 410 and 412 to determine who is the original author of a video file in dispute, specifically in the use cases addressed by this disclosure. Embodiments herein allow an original author of a video file to be determined by a video sharing system responsively to an authorship attribution request being initiated. An attribution can use reduced resources in any event and resources can be particularly minimized where a key segment is provided and a target video file is identified with a request. With use of an extracted key segment of a video file, an original author can be easily determined.

In one embodiment, an extracted key segment of a video file can be used by first and second video sharing system 410 and 412 so that each video sharing system 410 and 412 can independently determine an original author of a video file. In one embodiment, once the original author has been determined and agreed upon by first and second video sharing systems 410 and 412 a revenue share model agreed beforehand between first and second video sharing system 410 and 412, in terms of e.g. ad placement, video redirection, video blocking and/or any other pre-defined action.

The method involves interactions between a plurality of user systems, a plurality of manager systems, and a plurality of repositories. This interaction deals with the exchange of data, manipulation of the data, storing of data, encryption and authorship attribution of the data. The user system upon submission of a video file can create a unique form of password such as an extracted key segment of the video file for purposes of authorship attribution. By storing this extracted key segment remotely in a repository, be it in a SQL or NoSQL format, a manager system can then access the extracted key segment which can be in the same record as the video file at the repository when authorship attribution is initiated for the video file. Remote storing on a manager system of manipulated video data by a user system by a presenter that can be accessed later by the manager system to verify the presenter was the original author allows for the complex interactions to be executed.

Embodiments herein recognize that it can be important for video publishing video sharing systems to have the capability to uniquely identify the original author of created media content on the video sharing system, particularly when there are multiple competing parties claiming ownership to the video who have published very similar videos on the video sharing system. Embodiment herein recognize that being able to identify the true author of the video content would facilitate, e.g. determining of digital rights permissions based on authorship attribution. Embodiments herein also recognize advantages to information amongst video publishing video sharing systems to assist in identifying the true author of video content across a plurality of video publishing video sharing systems.

Embodiments herein recognize that plagiarism on many video publishing video sharing systems is prevalent, with users of the video sharing systems being able to download content and upload it again under their own name. Embodiments herein also recognize that such actions can result in significant losses of revenue to the original author, particularly if the plagiarizing user is able to market the content better, or creates slight tweaks to the content that draws a high level of traffic. Embodiments herein also recognize that such actions can result in misallocation of digital rights, e.g. digital rights permitting access to financial accounts providing payment based on authorship.

Embodiments herein further recognize that 'freebooting' is an issue faced by video publishing video sharing systems, i.e. taking online media content from one video sharing system and uploading it to another video sharing system. This not only takes away potential revenue from the original author, but as well from the original video publishing video sharing system.

Embodiments herein recognize the limits of authorship attribution methods like watermarking, fingerprinting and other video identification methods. These methods can provide support in particular cases and can be used with embodiments herein, but can include increased resource requirements in some embodiments. As a result such methods can be difficult to implement in large video sharing systems with thousands if not millions of video files, particularly when there are many competing users claiming to be an author across this large quantity of video files.

Embodiments herein recognize there is no easy way for an author of a video file whom is claiming that one or more infringers have copied, tweaked, or taken parts of their video content, and potentially done so through various video publishing video sharing systems, to prove that they are the original author of the video content and to mark these other videos as infringers.

Figure 6A:
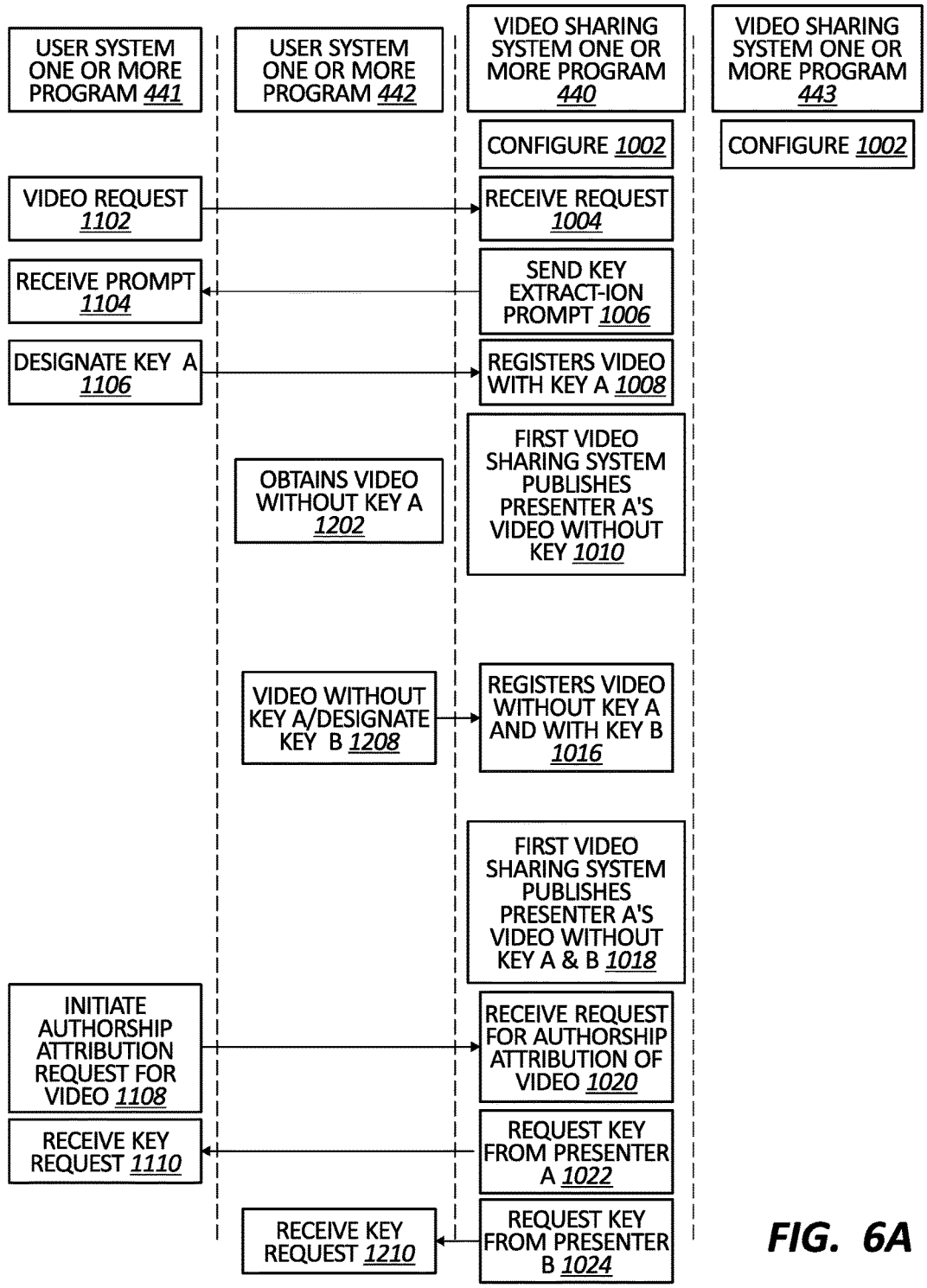
FIG. 6A-6C is a flow diagram illustrating a method in accordance with an embodiment as set forth herein.
Figure 6B:
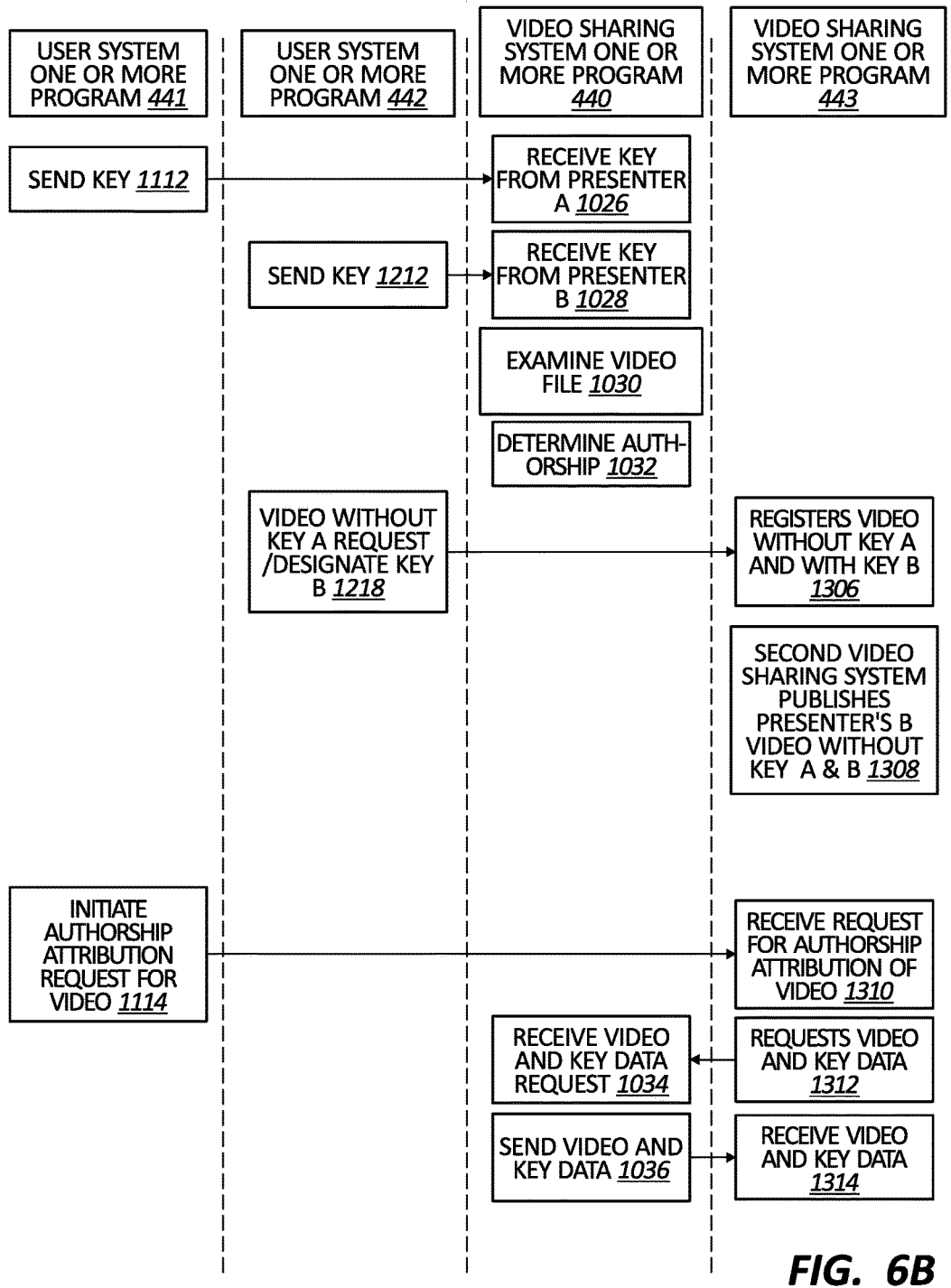
Figure 6C:
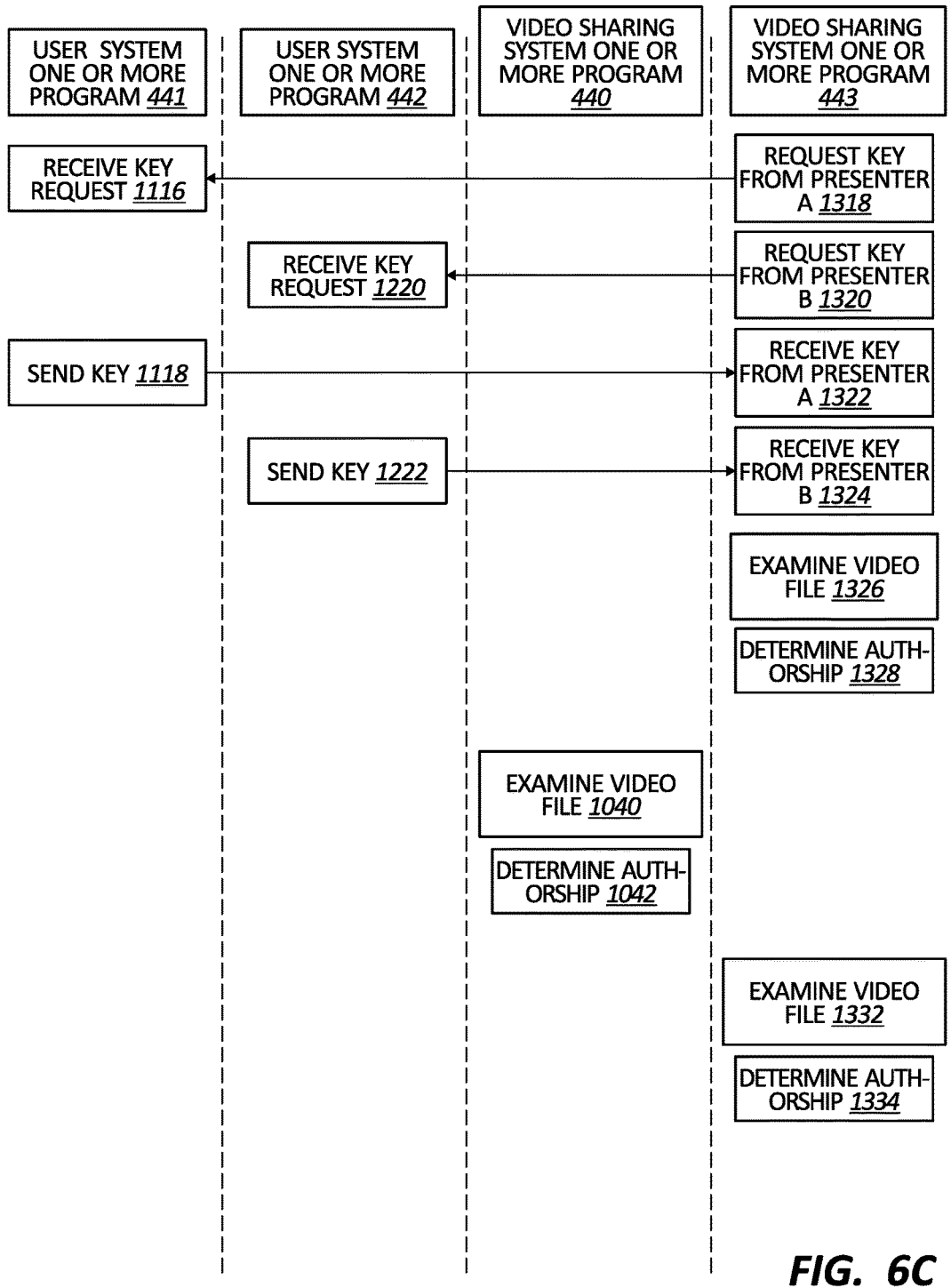

FIG. 6A-6C is a flow diagram illustrating further aspects of an authorship attribution method in accordance with an embodiment as set forth herein. By way of explanation, in FIG. 6A-6C, method elements are illustrated from the point of view of a first video sharing system one or more program 440 (e.g., running on video sharing system 410 of FIG. 4), first user one or more program 441 (e.g. running on user system 416), second user one or more program 442 (e.g. running on user system 418), and a second video sharing system one or more program 443 (running on e.g. video sharing system 412 of FIG. 4). While the flow diagram of FIG. 6A-6C depicts a relatively distributed computing environment, any distribution scheme for functions corresponding to those described in reference to the flow diagram of FIG. 6A-6C can be selected. In one embodiment, functions corresponding to all of the functions described in reference to the flow diagram of FIG. 6A-6C can be performed by one or more program, e.g., one or more program 440 running on a single computing node 100 (FIG. 3).

In one embodiment, some or all of the one or more program 440, 441, 442, 443 may run on a different collection of physical or virtual machines or processors, depending on the need for scalability of the system. In one embodiment, each of the one or more program 440, 441, 442, 443 can run on a different computer node 100. In one specific example, each of the one or more program 440, 441, 442, 443 can run on a single multi-processor computer system. In one specific example, each of the one or more program 440, 441, 442, 443 can run on a single single-processor computer system. In another specific example, various portions of video sharing system one or more program 440 may run on different processors running on different computing nodes 100. In another specific example, various portions of one or more program 441 may run on different processors running on different computing nodes 100. In another specific example, various portions of one or more program 442 may run on different processors running on different computing nodes 100. In another specific example, various portions of one or more program 443 may run on different processors running on different computing nodes 100.

In one embodiment, one or more program 440 runs on video sharing system 410, one or more program 443 runs on video sharing system 412, one or more program 441 runs on user system 416 operated by a first user and one or more program 442 runs on user system 418 operated by a second user.

By way of overview, FIG. 6A-6C illustrates, at least in part, one or more embodiment in which a video file may have authorship properly attributed.

In one embodiment, at block 1002 first video sharing system one or more program 440 can perform a configuration process to configure video sharing system one or more program 440 for performance of video file author attribution. Configuration options can be based on e.g. one or more operator user input that is input using a user interface that can be displayed on a display of video sharing system 410. Configuration options can include e.g. options to determine an extracted key segment of a video file, to options to require or not require certain user input for initiation on an authorship attribution, matching criteria for determining whether there is match between video file items (e.g. video files, video file records), and user interface options to allow user system users and/or video sharing system users select video files to comparatively examine based on one or more input of a user.

In one embodiment, at block 1102 a first user one or more program 441 e.g. based on one or more input into a user system 416 can send a request including a video file to first video sharing system one or more program 440 e.g. running on video sharing system 410. In one embodiment, the request can be a request to publish the video file on a publication database of the video sharing system 410. First video sharing system one or more program 440 at block 1006 responsively to receipt of the request at block 1004 can then generate a prompt to prompt for information defining an extracted key segment of the video file received at block 1004. At block 1104 one or more program 441 running on first user system 416 can receive the prompt from first video sharing system one or more program 440. The prompt can prompt a user of user system 416 running one or more program 441 to designate an extracted key segment of the video file received at block 1004. At block 1106 one or more program 441 based on one or more input entered into a user interface of user system 416 can designate a segment of video file as an extracted key segment and can send the key designation information to one or more program 440.

In one embodiment, for performance of blocks 1004, 1006, 1008 one or more program 440 can serve webpages which when opened by a browser of one or more program 441 at blocks result in a user interface being displayed on a display of user system 416. An example of a user interface for designating video files for uploading and key segment designations is user interface 702 as shown in FIG. 7. In area 706 a user of user system 416 can designate a video file to upload to video sharing system 410. By using a user interface control 714 within area 710 a user can designate a key segment for extraction from the video file e.g. designated at block 1102 using area 706. In one embodiment, area 710 can be displayed prior to uploading of the video file designated in area 706, e.g. prior to activation of submit button 720. In one embodiment, area 710 can be displayed responsively to a designated video file being uploaded to video sharing system 410, e.g. responsively to submit button 720 being activated and the designated video file designated in area 706 being uploaded.

Embodiments herein recognize the designation of the extracted key segment of a video file can be performed in a variety of ways e.g. tagging a particular segment of video file, entering extraction parameters, e.g. how many bits or bytes should be removed from a section of the authorship attribution video file, entering restriction parameters, e.g. type of video content exempted from extraction.

At block 1008 one or more program 440 can receive the extracted key segment designation and can responsively register the received video file received at block 1004 as an authorship attribution video file. Registering of a video file can include extracting a key segment of a video file and storing an authorship attribution video file record an authorship attribution database 610 of data repository 411. An authorship attribution video file record can include information of an authorship video file subject to extracting of a key segment. An authorship attribution video file record can include e.g. one or more of the extracted key segment or a key extracted video file, i.e. the video file absent the extracted key segment. Each authorship attribution video file record stored in an authorship attribution database 610 can be associated to a specific user of system 400. An authorship attribution video file record resulting from the registration of the video file registered as an authorship attribution video file at block 1008 can be associated to the first user of first user system 416. Extracting a key segment can be based on the extracted key segment designation received at block 1008.

At block 1010, one or more program 440 e.g. running on video sharing system 410 can publish the video file registered as an authorship attribution video file at block 1008 without the extracted key segment, i.e. can publish a key extracted video file corresponding to a received video file. A publication of a video file can include sending of a video file to a publication database 2180 so that the video file can be accessed by users of system 400, e.g. users who use user systems 416, 418 to access a video sharing website of video sharing system 410. One or more program 440 as set forth herein can be operative for extracting a key segment from a video file. A resulting key extracted video file as set forth herein can be forwarded for storage on an authorship attribution database for inclusion in an authorship attribution video file record. The resulting key extracted video file can also be published at block 1010 on a publication database of video sharing system 410.

Figure 8:
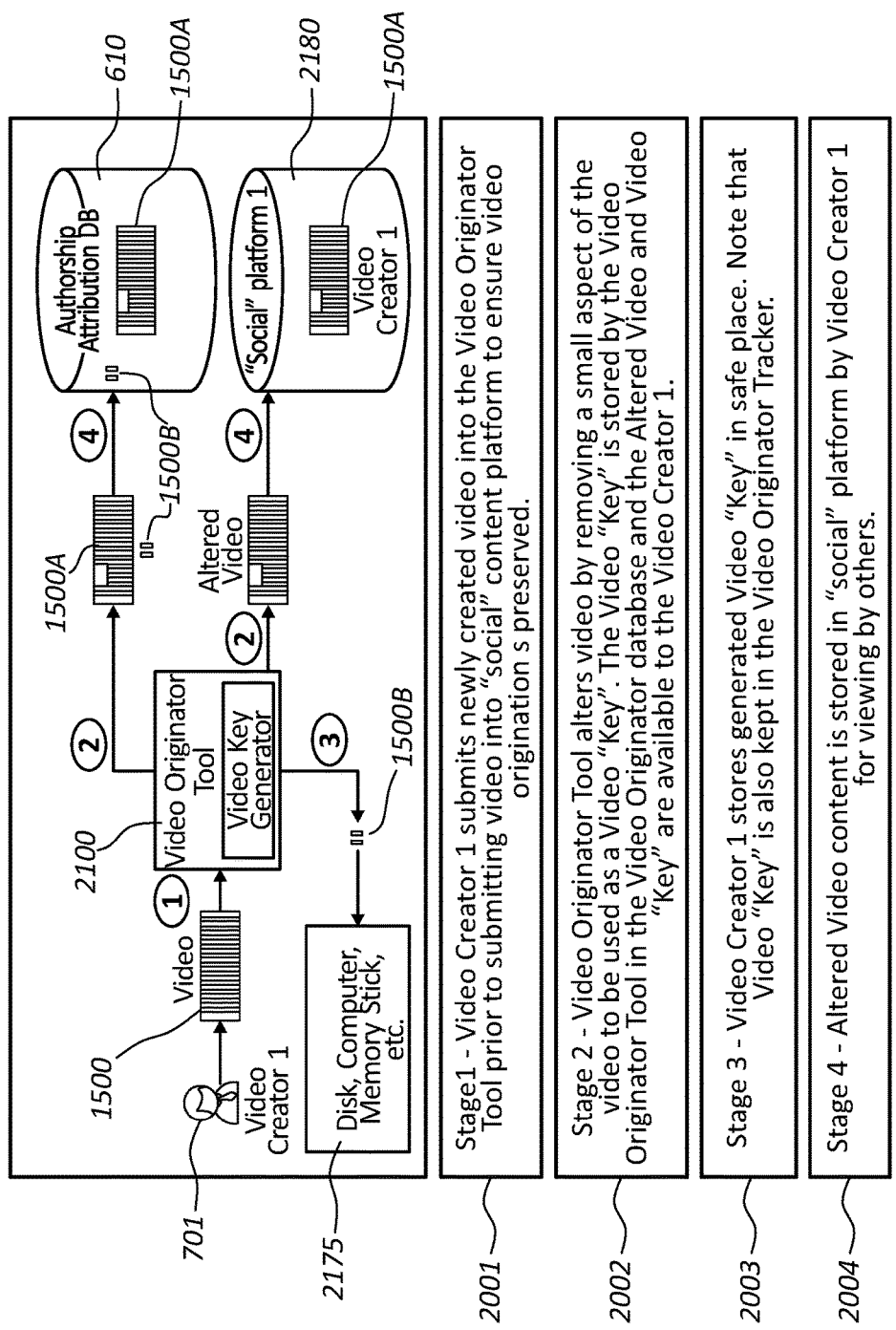
FIG. 8 is a schematic diagram illustrating aspects of a system having an authorship attribution database herein in accordance with an embodiment as set forth herein.

Further aspects of one or more program 440 registering a video file as an authorship attribution video file are described in reference to the schematic diagram of FIG. 8. In one embodiment, system 400 can include a video originator tool 2100. Video originator tool 2100 can be included in one or more program 440 running on video sharing system 410. As indicated by "1" a user can initiate presentment of a video file 1500 to video originator tool 2100. Video originator tool 2100 as indicated by "2" can perform key extracting as set forth herein e.g. by altering the video file by removing a small segment of the video file to be used as a "key segment". In one embodiment, the key segment can consist of one or more small pieces of video content. Video originator tool 2100 can be operative so that the number of key pieces forming a key segment can be randomly determined in one embodiment. Video originator tool 2100 in one embodiment can generate a key segment based on a user defined key segment designation as set forth herein (block 1106). In addition to or alternatively to video originator tool 2100 generating an extracted key segment based on a user defined key segment designation as set forth herein (block 1106), video originator tool 2100 can generate a key segment based on system setup parameters, which may be established at configuration block 1002. System setup parameters can include e.g. parameters generating an extracted key segment include key pieces randomly distributed throughout an entirety of video content of a video file.

Embodiments herein recognize that extracting of a key segment from a video file can be performed without detracting substantially from the visual quality of the video file. For example, most video formats include frame rates of 30 FPS or higher with this number trending upwardly with increasing bandwidths. Removing frames or content of frames from video files can be performed without the removing being perceivable by a viewer. In some embodiment, to speed up and/or simplify examining of video file data, system 400 can require a minimum segment of a video file be designated, e.g. a time segment of at least a minimum time, e.g. at least 1 second, a frame count of a minimum number of successive frame e.g. at least 15 successive frame. An extracted key segment herein can be defined based on user defined information in one embodiment, can be based on default parameters in one embodiment, and can be based on a combination of user defined information and default parameters in one embodiment. An extracted key segment can include e.g. video data of one or more of distributed non-successive frames of video data, successive frames of video data, or random frames of video data.

With further reference to the flow diagram of FIG. 8, video originator tool 2100 as indicated by "2" can forward data resulting from a key segment extracting to various destinations. For example, video originator tool 2100 can forward information of a video file that has been subject to key segment extraction to authorship attribution database 610. Authorship attribution database 610 can store data for use in performing authorship attribution. Authorship attribution database 610 can store e.g. record of a video file 1500 registered as an authorship attribution video file and subject to key extraction. Such information can include a key extracted video file 1500A that is absent a key segment and key segment 1500B. In another embodiment, authorship attribution database 610 can store key extracted video file 1500A that is absent a key segment without storing key segment 1500B. In another embodiment, authorship attribution database 610 can store key segment 1500B without storing key extracted video file 1500A. Authorship attribution database 610 can store a user ID associated to each authorship attribution video file record and each authorship attribution video file record of authorship attribution database 610 can include e.g. one or more of a key extracted video file 1500A or an extracted key segment 1500B resulting from extracting of a key segment from a video file.

A video file registered as an authorship attribution video file and subject to generation of a key segment can be regarded as authorship attribution video file. A registration of a video file as an authorship attribution video file can include storing a record of the authorship attribution video file into authorship attribution database 610. A record of an authorship attribution video file e.g. video file 1500 can include information of an extracting performed on a received video file. A record of an authorship attribution video file can include one or more of key extracted video file e.g. file 1500A and a key segment 1500B. A key extracted video file and an extracted key segment stored in authorship attribution database 610 for use in performing authorship attribution can be regarded as authorship attribution video data. Key extracted video file 1500A and a key segment 1500B can e.g. be stored in the case of logical extraction as a single file with programmed logic defining the extraction or in the case of electronic extraction as separate files in separate memory locations. A high level storage description of a key extracted video file 1500A and an extracted key segment 1500B in one embodiment on an online highly scalable distributed video sharing system stored as a single file is as follows.

Video ID|Title|Length(seconds)|Key start|Key End| . . .
100001|Surprising video|122.4|1.1|2.1| . . .

In another embodiment, a key extracted video file 1500A and an extracted key segment 1500B and be stored in a different logical (and physical) storage locations as indicated by the following high level storage description.
Video ID|Title|Length(seconds)|Key position|Key ID| . . .
100001|Surprising video 122.4|1.1|200001| . . .
Key ID|Length(seconds)|Binary content| . . .
200001|1|xxxxxx| . . .

As indicated by "3" video originator tool 2100 can send key segment 1500B for storing by a user. Video originator tool 2100 can send key segment 1500B to user system 416 for storing e.g. for storing e.g. on a desktop, other computer, memory stick 2175 of a user system, e.g., user system 416.

As indicated by "4" video originator tool 2100 send key extracted video file 1500A to publication database 2180 for publication therein.

Embodiments herein recognize that users other than a user initiating publication of a video file may wish to republish the video file. System 400 can provide authorship attribution in such a scenario. Referring to the flow diagram of FIG. 6A-6C a second user at block 1208 can initiate republishing of video content published at block 1010. In one embodiment a user interface 702 as shown in FIG. 7 can be accessed based on one or more input of a second user and displayed on user system 418 and the second user can designate the video file published at block 1010 for uploading. Using area 710 of user interface 702 a user can designate a key for extracting and at block 1208 one or more program 442 can send the designated video file and the designated key information to one or more program 440 running on video sharing system 410. The flow diagram of FIGS. 6A-6C illustrates the use case where a second user initiates a sending of a video file with designated key information. In another use case a second user can initiate a sending of a video file without designating a key at block 1208 (e.g. by electing not to use area 710 of user interface 702).

One or more program 440 responsive to receiving the key segment designation from second user at block 1016 can register the video file received at block 1012 as an authorship attribution video file. For such registering, one or more program 440 can perform key segment extracting and storing of extraction data, e.g. one or more of key extracted video file and an extracted key segment into authorship attribution database 610. At block 1018, with a key extracted video file corresponding to the video file received at block 102 available one or more program 440 can publish a key extracted video file onto publication database 2180 of video sharing system 410 where the key extracted video file can be accessed publicly by users of user systems such as user system 416 and user system 418. Where a key is not designated by a user initiated publication request at block 1208, the video file published at block 1018 can be the video file published at block 1010 and can be absent a single key segment, the key segment designated at block 1106.

A user of user system 416 can observe the publishing at block 1018 and may wish to take action resulting in e.g. the publishing at block 108 being removed. At block 1108 one or more program 441 e.g. based on one or more input of a user of user system 414 (FIG. 4) can send an author attribution request for the video file published at block 1018 by one or more program 440. In one embodiment, an authorship attribution request sent at block 1108 can include file information identifying one or more video file of the requester previously registered as an authorship attribution video file. In one embodiment, an authorship attribution request sent at block 1108 can include an identifier of an authorship attribution video file record of the requester stored in authorship attribution database 610. In one embodiment one or more program 440 for performing an authorship attribution can use the authorship attribution video file record of the video file registered as an authorship attribution video file at block 1008. An attribution request sent at block 114 can include an identifier of published video file subject to authorship attribution and an identifier of one or more video file of the requester that has been registered as an authorship attribution file, e.g., an authorship attribution video file record of the user initiating the request.

At block 1022, one or more program 440 can request a key segment from one or more program 441. One or more program 441, e.g. running on user system 416 can receive the request at block 1110, and based on one or more input of a user of user system 416 can send a key segment to determine authorship attribution of the video. One or more program 440 can receive the key segment at block 1026. At block 1024 one or more program 440 can request a key segment one or more program 442 e.g. running on second user system 418. One more program 442 can receive the request at block 1210, and based on one or more input of a second user at second user system 418 can at block 1212 send a key segment (or alternatively the second user system 418 can be nonresponsive thus indicating that the second owner does not claim authorship or send a message designated by the second user that the second user acknowledges that the second user is not the author). One or more program 440 can receive the key segment at block 1028.

Responsively to receipt of an authorship attribution request at block 1020 one or more program 440 can search and identify one or more attribution video file records of authorship attribution database 610 based on the information of the request. One or more program 440 at block 1030 can perform examining of the video file identified as being subject to authorship attribution (the video file for attribution). An examining at block 1030 can include using content of authorship attribution database 610, e.g. content of an authorship attribution video file record of the user requester.

One or more program 440 performing examining at block 1030 can consume minimal processing resources in any event and can consume particularly minimal resources in the case the second user at block 1208 requests republication of the identical video file published at block 1010 without designating a key segment at block 1208. In such instance a video file published at block 1018 can match the video file subject to registration at block 1008 except will be missing the key segment designated at block 1106.

In one embodiment one or more program 440 performing examining at block 1030 can include examining a video file for attribution to determine whether an authorship attribution video file record identified by user defined information of a request includes a superset of video data of a video file for attribution. In one embodiment one or more program performing examining at block 1030 can include examining a video file for attribution identified in an attribution request to determine whether the video file for attribution includes video data of an extracted key segment of an authorship attribution video file record identified by a request.

In one embodiment one or more program 440 performing examining at block 1030 program 440 can include examining a video file for attribution using an extracted key segment received from a requester using a requester user system, e.g. the extracted key segment sent at block 1112. In one embodiment one or more program 440 performing examining at block 1030 can include examining a video file for attribution using an extracted key segment received from the user initiating publication of the video file for attribution, e.g. the extracted key segment sent at block 1212.

One or more program 440 at block 1032 can determine that the first user is the original author of the video file presented at block 1108 for authorship attribution based on an examining at block 1030 of the video file for attribution using content of the authorship attribution database 610.

In one embodiment, one or more program 440 at block 1032 can determine that a first user is an original author of a video file for attribution if an examining of the video file for attribution at block 1030 determines that the video file for attribution is missing a key segment of an authorship attribution video file record In one embodiment, one or more program 440 at block 1032 can determine that a first user is an original author of a video file for attribution if an examining of the video file for attribution at block 1030 determines that the video file for attribution is missing a key segment of an authorship attribution video file record and the key segment matches a key segment received from the first user at block 1026. In some embodiments system 400 can rely on a key segment of authorship attribution video file record for use in making an authorship attribution, and in some embodiments for additional security can require that an extracted key segment matching an extracted key segment of authorship attribution database 610 is received.

In one embodiment, one or more program 440 can determine at block 1032 that a first user is an original author of a video file for attribution if an examining at block 1030 of the video file for attribution determines that the authorship attribution video file record includes a subset of video data of a video file for attribution and a key segment received from the first user matches the additional video data of the superset.

An examining of a video file for attribution at block 1030 can include examining a key segment associated to a video file for attribution e.g. the key segment received at block 1028. One or more program 440 can determine at block 1032 that a first user is an original author of a video file for attribution if an examining of the video file for attribution at block 1032 determines that key segment associated to a video file for attribution includes video data of an authorship attribution video file record (thus showing the key segment was designated after registration of the authorship attribution video file record).

Skilled artisans will recognize that system 400 can resolve authorship disputes between a first user and a second user where a second user republishes an extracted key segment video file published based on a request initiated by the first user, even where the second user initiates registration of the republished extracted key segment video file as an authorship attribution video file. The second user's video key segment designated with respect to the republished key extracted video file will include video data of the authorship attribution video filed registered based on a request of the first user. The first user's video key segment designated with respect to the initially published key extracted video file will include video data that is absent of the authorship attribution video file registered based on a request of the second user.

With authorship attribution of a video file determined, one or more program 440 running on video sharing system 410 can then appropriately allocate digital rights, e.g. by assigning digital rights to the user of user system 416 to permit receipt of royalty payments, and assigning rights to the user of second user system 418 to restrict permissions of that user.

Embodiments herein recognize performing authorship attribution can include multiple alternative processes. The number of users claiming authorship is not defined, and one or more program 440 can perform authorship attribution an unlimited number of times in response to an unlimited number of requests.

Further, while a user initiated request is indicated at block 1108, authorship attribution does not have to be user initiated, although configuring system 400 to be responsive to requests for authorship attribution from user system users only may provide a convenient way for an author to allow re-posting of the author's content by default.

One or more program 440 for example can be configured to perform authorship attribution automatically, e.g. continually, at pre-set intervals, or responsively to receipt of any presented video file, e.g. receipt of video file with a request for publication. One or more program 440 can also be configured to perform authorship attribution without using a key segment received from a user system at a time of the authorship attribution, e.g., by examining one or more key segment stored in authorship attribution database 610 stored at one or more time of registering a video file as an authorship attribution video file and storing a record of the authorship attribution file into authorship attribution database 610. In one embodiment, one or more program 440 can be configured to perform authorship attribution based on an operator user of video sharing system 410 entering one or more input into a user interface of video sharing system 410 to initiate an authorship attribution.

Figure 9:
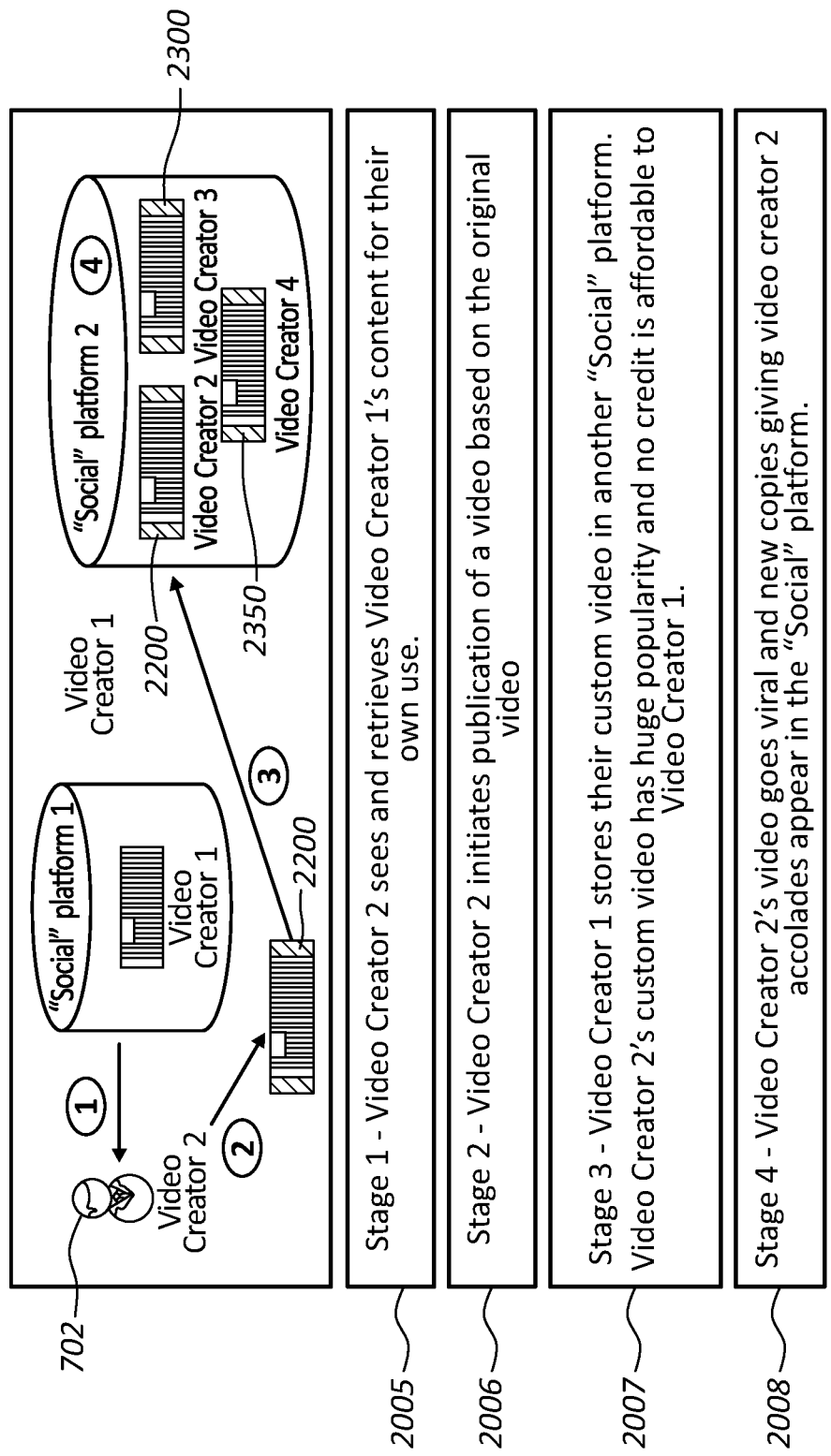
FIG. 9 is a schematic diagram illustrating multiple users initiating publication of video files in accordance with an embodiment as set forth herein.

Blocks 1030 and 1032 describe authorship attribution in the case a video file having content of first user is subject to a request for publication by a second user on a common publication video sharing system e.g. video sharing system 410. Embodiments herein recognize other potential risks associated with publishing video file content of a user. For example in reference to FIG. 9 a video file having content of a video file of a first user can be published on a first video sharing system e.g. a publication video sharing system of video sharing system 410. A second user "Video Creator 2" may observe the publication and then request to publish on a second publication video sharing system of a second video sharing system 412 a video file having video file content of the first user. Many video files having content of the user can be published on the second publication video sharing system.

Additional aspects of system 400 involving a second video sharing system one or more program 443 running on a second video sharing system 412 are described in reference to the flow diagram of FIGS. 6A-6C.

System 400 can provide authorship attribution in the case that a second user republishes on a second video sharing system video content published on a first video sharing system. Referring to the flow diagram of FIG. 6A-6C a second user at block 1218 can initiate republishing of video content published at block 1010, wherein the publishing occurs on a first video sharing system 410 and the republishing occurs on a second video sharing system 412. In one embodiment a user interface 702 as shown in FIG. 7 can be accessed based on one or more input of a second user and displayed on user system 418 and the second user can designate the video file published at block 1010 for uploading to second video sharing system 412. Using area 710 of user interface 702 a user can designate a key for extracting and at block 1208 one or more program 442 can send the designated video file and the designated key information to one or more program 440 running on video sharing system 410. The flow diagram of FIGS. 6A-6C illustrates the use case where a second user initiates a sending of a video file with designated key information. In another use case a second user can initiate a sending of a video file to second video sharing system 412 without designating a key at block 1208 (e.g. by electing not to use area 710 of user interface 702)

Responsively to receipt of the key segment designation at block 1306 one or more program 443 can register the video file received at block 1302 as an authorship attribution video file. Registering can include extracting a designated key segment and storing a record of the authorship attribution video file in an authorship attribution database 610 of second video sharing system 412 in the manner described with reference to authorship attribution database 610 of video sharing system 410. The extracting can include logical and/or electronic extracting as set forth herein.

At block 1308, with key segment extracting having been performed at block 1008 and block 1306 one or more program 443 can publish a key extracted video file without the key segment designated at block 1106 by the user (key A) of user system 416 and without the key segment designated at block 1208 by the user (key B) of user system 418. Where a key is not designated by a user initiated publication request at block 1218, the video file published at block 1306 can be the video file published at block 1010 and can be absent a single key segment, the key segment designated at block 1106.

With the video file published by second video sharing system 412 at block 1308 the original author first user may observe the publication. System 400 facilitates the first user taking action.

At block 1114 or more program 441 based on one or more input of a user system 416 can send a request to initiate an authorship attribution of the video file published at block 1308. At block 1310 one or more program 443 e.g. running on second video sharing system 412 can receive the request and responsively thereto can perform authorship attribution. In one embodiment, video sharing system 410 and video sharing system 412 can be operative for information exchange therebetween as set forth herein. At block 1312 one or more program 443 can send an information exchange request to one or more program 440 running on video sharing system 410 to request sharing of data of repository 411 and specifically to authorship attribution database 610. One or more program 440 can receive the request at block 1034 and send requested data at block 1036. Second video sharing system one or more program 443 can receive the exchanged data at block 1314. Skilled artisans will recognize that sharing of data between repositories of different video sharing systems, e.g. repositories 411 and 413 of respective video sharing systems 410 and 412, and specifically their respective authorship attribution databases 610, can occur at any time, e.g., a present daily update intervals, and need not be responsive to performing of a current authorship attribution.

Embodiments herein recognize that sharing between data repositories e.g. 411 and 413, and specifically between authorship attribution databases 610 of the repositories 411 and 413 can be performed in multiple ways. One or more program 443 can request data from one or more program 440 or one or more program 440 can request data from one or more program 443. Second video sharing system one or more program 443 can request from more than one video sharing system. Second video sharing system one or more program 443 can specify the video file it seeks or determine a wide-ranging criteria, such as genre, publishing date or publishing date range, author, title. One or more program 443 can also potentially request a transfer of the entire or section of the authorship attribution database 610 of first data repository 411 associated to video sharing system 410 in one embodiment. Sharing of data between video sharing systems 410 and 412 can be in accordance with an appropriate external sharing method e.g. using Electronic Data Interchange (EDI).

Data management by a video sharing system 410 of a plurality of video files can be done through a variety of data management methods, such as for example, SQL or NoSQL databases. Management of the video files can also further be managed by video sharing system 410 not by records in a query language format, but by creating a database of pointers to addresses where the video data is contained to index and manage the video files. The video files can be stored on hard disk or other long term storage device and accessed when needed. This database of pointers allows for efficiency in handling large amounts of video data. Databases can further describe video files, such as video ID number, genre, author, and submission date. Databases can also be sharded. One of ordinary skill in the art would know that databases with sharding may be performed to partition massive databases into manageable subparts with video sharing system 410 having policies to pull data from the relevant shards on a data request. The shards may be determined based on qualities such as time submitted or genre in a way that make them manageable to video sharing system 410 so that upon a request for data video sharing system 410 can retrieve the relevant video data, e.g. authorship attribution video file records.

Content can be exchanged between video sharing systems through an authorization process. Standard coding procedures in, for example object-oriented languages, typically designate data, also known as state, as private for purposes of data access meaning that the data cannot be directly accessed by external mechanisms, such as for example, classes in object-oriented languages. Development during the program code that will access this data typically requires function calls, also known as behavior of the data that can allow a video sharing system to access the data without passing the private data member to the video sharing system. This is also known to those of ordinary skill in the art as encapsulation of the private data. Thus content can be exchanged between video sharing systems with private data being maintained as private data. A communication channel can be operational so that, for example, a first video sharing system 410 may send messages to a second video sharing system 412. Upon receiving a message to access data from the first video sharing system 410, the second video sharing system 412 may determine if the first video sharing system 410 is authorized.

Referring further to a particular method of the flow diagram of FIG. 6A-6C one or more program 443 at block 1318 can request a key segment from one or more program 441 and at block 1320 can request a key segment from second video presenter one or more program 442. One or more program 441 can receive the request at block 1316 and send a key segment at block 1318 based on one or more user input entered into user system 416. One or more program 442 receives a request at block 1220 and sends a key segment at block 1222 based on one or more second user input entered into second user system 418.

One or more program 443 running on second video sharing system 412 can receive the key segment from one or more program 441 at block 1322 and receive the key segment from one or more program 442 at block 1324. One or more program 443 at block 1326 can perform examining of a video file for attribution using content of an authorship attribution database 610 and at block 1328 can determine authorship of the video file for attribution based on the examining.

Responsively to receipt of an authorship attribution request at block 1140 one or more program 443 can search and identify one or more attribution video file records of authorship attribution database 610 based on the information of the request. One or more program 443 at block 1326 can perform examining of the video file identified as being subject to authorship attribution (the video file for attribution). An examining at block 1326 can include using content of authorship attribution database 610, e.g. content of an authorship attribution video file record of the user requester.

One or more program 443 performing examining at block 1326 can consume minimal processing resources in any event and can consume particularly minimal resources in the case the second user at block 1218 requests republication of the identical video file published at block 1010 without designating a key segment at block 1218. In such instance a video file published at block 1306 can match the video file subject to registration at block 1008 except will be missing the key segment designated at block 1106.

In one embodiment one or more program 443 performing examining at block 1326 can include examining a video file for attribution to determine whether an authorship attribution video file record identified by user defined information of a request includes a superset of video data of a video file for attribution. In one embodiment one or more program performing examining at block 1326 can include examining a video file for attribution identified in an attribution request to determine whether the video file for attribution includes video data of an extracted key segment of an authorship attribution video file record identified by a request.

In one embodiment one or more program 443 performing examining at block 1326 program 443 can include examining a video file for attribution using an extracted key segment received from a user requester using a requester user system, e.g. the extracted key segment sent at block 1118. In one embodiment one or more program 443 performing examining at block 1326 can include examining a video file for attribution using an extracted key segment received from the user initiating publication of the video file for attribution, e.g. the extracted key segment sent at block 1222.

One or more program 443 at block 1328 can determine that the first user is the original author of the video file identified at block 1114 for authorship attribution based on an examining at block 1326 of the video file for attribution using content of the authorship attribution database 610.

In one embodiment, one or more program 443 at block 1032 can determine that a first user is an original author of a video file for attribution if an examining of the video file for attribution determines that the video file for matching is missing a key segment of an authorship attribution video file record In one embodiment, one or more program 443 at block 1032 can determine that a first user is an original author of a video file for attribution if an examining of the video file for attribution at block 1326 determines that the video file for attribution is missing a key segment of an authorship attribution video file record and the key segment matches a key segment received from the first user at block 1322. In some embodiments system 400 can rely on a key segment of authorship attribution video file record for use in making an authorship attribution, and in some embodiments for additional security can require that an extracted key segment matching an extracted key segment of authorship attribution database 610 is received.

In one embodiment, one or more program 443 can determine at block 1328 that a first user is an original author of a video file for attribution if an examining at block 1326 of the video file for attribution determines that the authorship attribution video file record includes a subset of video data of a video file for attribution and a key segment received from the first user matches the additional video data of the superset.

An examining of a video file for attribution at block 1326 can include examining a key segment associated to a video file for attribution e.g. the key segment received at block 1322. One or more program 443 can determine at block 1328 that a first user is an original author of a video file for attribution if an examining of the video file for attribution at block 1326 determines that key segment associated to a video file for attribution includes video data of an authorship attribution video file record (thus showing the key segment was designated after registration of the authorship attribution video file record).

Skilled artisans will recognize that system 400 can resolve authorship disputes between a first user and a second user where a second user republishes an extracted key segment video file published based on a request initiated by the first user, even where the second user initiates registration of the republished extracted key segment video file as an authorship attribution video file. The second user's video key segment designated with respect to the republished key extracted video file will include video data of the authorship attribution video filed registered based on a request of the first user. The first user's video key segment designated with respect to the initially published key extracted video file will include video data that is absent of the authorship attribution video file registered based on a request of the second user.

Responsively to determining an author of a video file for attribution one or more program 443 running on video sharing system 412 can appropriately allocate digital rights to users of system 400, e.g. by assigning digital rights to the user of user system 416 to permit receipt of royalty payments, and assigning rights to the user of second user system 418 to restrict permissions of that user. Permissions restricted can include e.g. permissions to initiate requests, e.g. for publication, registration, and/or authorship attribution of a video file.

Figure 10:
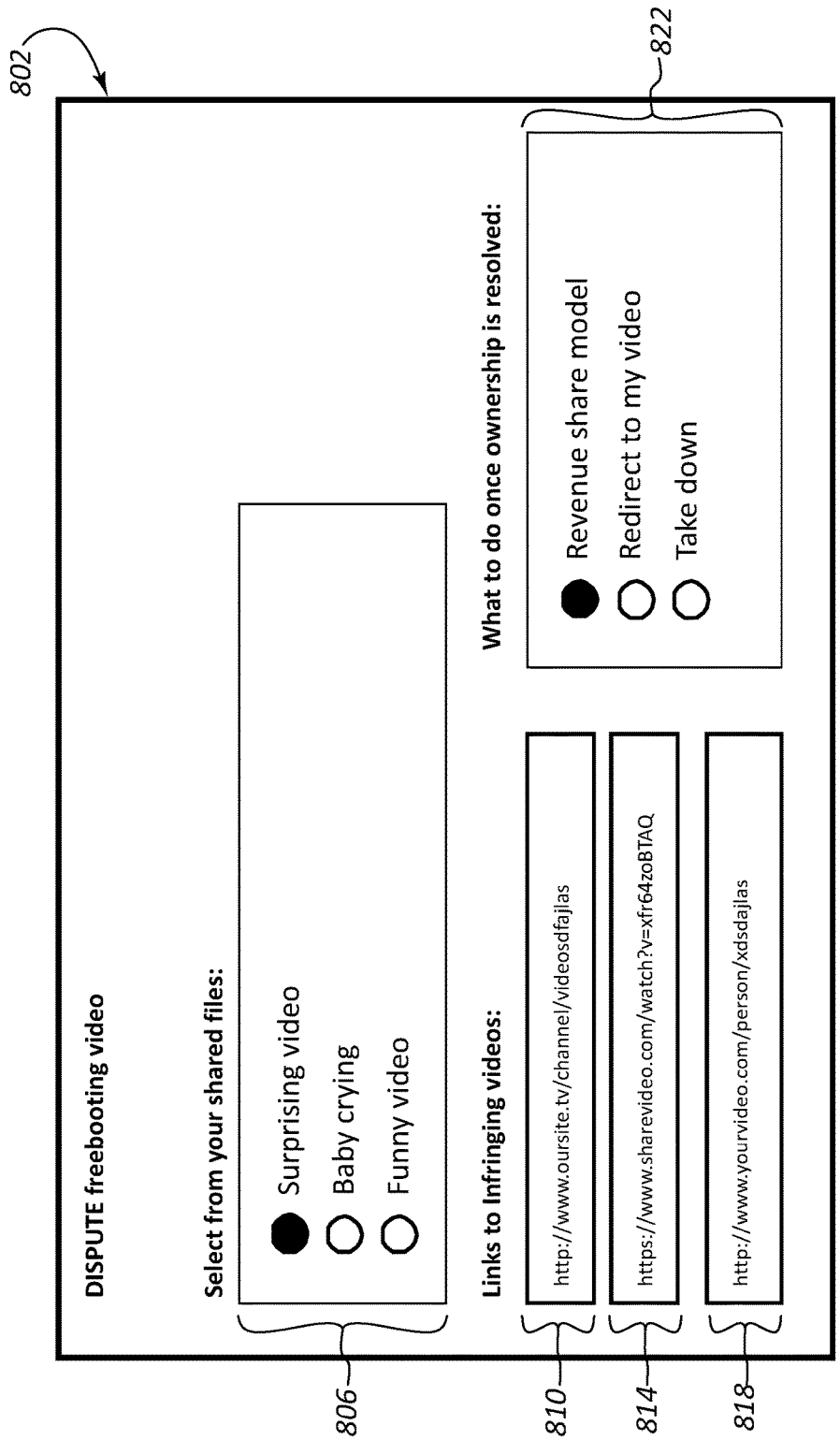
FIG. 10 is a schematic diagram illustrating a user interface for use in initiating a request for authorship attribution in accordance with an embodiment as set forth herein.

A user of system 400 can use a user interface as shown in FIG. 10 for defining authorship attribution requests. User interface 802 as shown in FIG. 10 can be provided as a webpage of a website hosted by video sharing system 410 and/or video sharing system which webpage can be opened using a browser of one or more program running on a user system. A user of user system 416 can initiate display of user interface on a display of user system 416. A user of user system 418 can initiate display of user interface on a display of user system 418. In areas 810, 812, 814 a user can designate one or more video file to be subject to attribution by system 400, and in area 806 can designate one or more authorship attribution video file record of the user which the user believes will provide evidence that the user is the original author of the one or more video file designated at areas 810, 814, and 812. At area 822 the user can indicate actions to be taken by system 400 responsively to determining authorship of a video file for attribution. In response to determining an authorship of a video file, system 400 can assign digital rights in accordance with the options indicated in area 822. Options can include options to assign digital rights by assigning royalty payments (revenue share option), options to assign digital rights by assigning a redirect (redirect to my video), and a take down option (take down). If a redirect option is selected, an authorship attribution in favor of a first user where a video file for attribution is a video file of a second user will result in system 400 configuring system 400 so that a request for the second user's video file will redirect to a video file of the first user, e.g. a video file having content of the first user's designated authorship attribution file record. If a take down option is selected, an authorship attribution in favor of a first user where a video file for attribution is a video file of a second user will result in system 400 assigning digital rights provided by restricting digital rights of the second user by taking down the video file for attribution of the second user.

With sharing of content between authorship attribution databases 610 of first video sharing system 410 and second video sharing system 412 established as set forth herein, it will be seen that a user using user interface 802 can be logged in and using any video sharing system of system 400 e.g. video sharing system 410 or video sharing system 412, and can be a registered user of any video sharing system of system 400 and can have authorship attribution video file records in an authorship attribution database 610 of any video sharing system of system 400 e.g. video sharing system 410 or video sharing system 412. In the embodiment described with reference to blocks 1326 and 1328 a user initiating authorship attribution can be a user using a second video sharing system having authorship attribution video file records registered by a first video sharing system 410 who requests attribution of a video file published on the second video sharing system 412. However, any permutation is possible. System 400 can be configured so that the user can be using either of the first or second video sharing systems 410 or 412, so that designated authorship attribution video files have been registered on either of the first of either of the first or second video sharing systems 410 or 412, and so that a video file designated for attribution is a published video file published on either of the first or second video sharing systems 410 or 412.

Embodiments herein recognize that authorship attribution can be performed in alternative ways and the above description is for purposes of illustration. The number of users claiming authorship is not restricted. Further, an authorship attribution does not require a user to initialize it. One or more program 440 running on first video sharing system 412 or one or more program 443 running on second video sharing system 412 can be configured to perform authorship attribution automatically e.g. continually or at predetermined time intervals or automatically responsively to receipt of any request with a video file received by any user system. Blocks 1040 and 1042 of the flow diagram of FIG. 6A-6C illustrate one or more program 440 e.g. running on video sharing system 410 performing authorship attribution in a manner without a request from a user device. Blocks 1332 and 1334 of the flow diagram of FIG. 6A-6C illustrate one or more program 443 e.g. running on video sharing system 412 performing authorship attribution in a manner without a request from a user device. One or more program 440 and one or more program 443 can be configured to perform authorship attribution of a video file without using key segments, but rather by comparing a video file to which a current authorship attribution request pertains to one or more authorship attribution video files of system 400 registered in system 400. To the extent an authorship attribution includes using key segments associated to a user the one or more program performing the authorship attribution need not obtain the key segment from user system at a time of performing the attribution. Rather, the one or more program performing the authorship attribution can read the key segment from authorship attribution database 610 which database may have stored the key segment at the time of registration of an authorship attribution video file. One or more program 440 can be configured to perform authorship attribution based on one or more input entered by an operator user of second video sharing system 410 to initiate an authorship attribution. One or more program 443 can be configured to perform authorship attribution based on one or more input entered by an operator user of second video sharing system 412 to initiate an authorship attribution.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompass relationships where an element is partially based on as well as relationships where an element is entirely based on. Forms of the term "defined by" encompass relationships where an element is partially defined by as well as relationships where an element is entirely defined by. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
examining, by one or more processor, a video file using content of an authorship attribution database, the authorship attribution database including one or more authorship attribution video file record, wherein a record of the one or more authorship attribution video file record includes information of an authorship attribution video file subject to key extraction; and
determining, by the one or more processor, authorship attribution of the video file based on the examining, wherein the method includes receiving a user video file from a user and extracting from the user video file a key segment, and publishing an extracted key segment video corresponding to the video file.

2. The method of claim 1, wherein the information of an authorship attribution video file includes one or more of the following selected from the group consisting of: an extracted key segment and a key extracted video file.

3. The method of claim 1, wherein the one or more authorship attribution video file record includes a plurality of authorship attribution video file records, wherein a first record of the plurality of authorship attribution video file records is associated to a first user, wherein a second record of the plurality of authorship attribution video file records is associated to a second user.

4. The method of claim 1, wherein the examining includes examining to determine whether an identified authorship attribution video file record stored in the authorship attribution database includes a superset of video data of the video file.

5. The method of claim 1, wherein the examining includes examining to determine whether the video file for attribution includes video data of an extracted key segment of an identified authorship attribution video file record stored in the authorship attribution database.

6. The method of claim 1, wherein video file is a published video file, wherein the examining includes examining a video file for attribution using an extracted key segment associated to the video file received from a user initiating publication of the video file.

7. The method of claim 1, wherein the method includes receiving a user video file from a user and extracting from the user video file a key segment.

8. The method of claim 1, wherein the method includes receiving a user video file from a user and storing in the authorship attribution database an authorship attribution video file record corresponding to the user video file.

9. The method of claim 1, wherein the method includes extracting a key segment from a received video file to define an extracted key segment and storing in the authorship attribution database an authorship attribution video file record corresponding to the received video file, the authorship attribution video file record corresponding to the received video file having information of the extracted key segment.

10. The method of claim 1, wherein the method includes extracting a key segment from a received video file received from a user to define an extracted key segment and storing in the authorship attribution database an authorship attribution video file record corresponding to the received video file, the authorship attribution video file record corresponding to the received video file having information of the extracted key segment, wherein the extracting is based on user defined key segment designation information defined by the user.

11. The method of claim 1, wherein the method includes receiving a user video file from a user and extracting from the user video file a key segment, publishing an extracted key segment video corresponding to the user video file, and storing in the authorship attribution database an authorship attribution video file record corresponding to the user video file.

12. The method of claim 1, wherein the examining is responsive to a user initiated authorship attribution request.

13. The method of claim 1, wherein the examining is performed responsively to a user initiated authorship attribution request, wherein information of the user initiated authorship attribution request includes an identifier of the video file and an identifier of an authorship attribution video file record.

14. The method of claim 1, wherein the examining includes using a key segment extracted from the video file and received from a user publisher of the video file.

15. The method of claim 1, wherein the examining is performed responsively to a user initiated request initiated by an attribution requesting user, wherein the method includes prompting the attribution requesting user for an extracted key segment, receiving the extracted key segment from the attribution requesting user and wherein the examining includes using the extracted key segment received from the attribution requesting user.

16. The method of claim 1, wherein the method includes receiving an extracted key segment from a user, wherein the examining includes using the extracted key segment and wherein the extracted key segment is an extracted key segment of an authorship attribution video file record of the authorship attribution database.

17. The method of claim 1, wherein the examining is performed by a first video sharing system, and wherein the content includes content exchanged from a second video sharing system external to the first video sharing system.

18. The method of claim 1, wherein the information of the authorship attribution video file includes a key extracted video file, the key extracted video file being absent of the key segment.

19. A method comprising:

examining, by one or more processor, a video file using content of an authorship attribution database, the authorship attribution database including one or more authorship attribution video file record, wherein a record of the one or more authorship attribution video file record includes information of an authorship attribution video file subject to key extraction; and determining, by the one or more processor, authorship attribution of the video file based on the examining, wherein the examining is performed responsively to a user initiated request initiated by an attribution requesting user, wherein the method includes prompting the attribution requesting user for an extracted key segment, receiving the extracted key segment from the attribution requesting user and wherein the examining includes using the extracted key segment received from the attribution requesting user.

20. A method comprising:

examining, by one or more processor, a video file using content of an authorship attribution database, the authorship attribution database including one or more authorship attribution video file record, wherein a record of the one or more authorship attribution video file record includes information of an authorship attribution video file subject to key extraction; and determining, by the one or more processor, authorship attribution of the video file based on the examining, wherein the information of the authorship attribution video file includes a key extracted video file, the key extracted video file being absent of a key segment.

* * * * *